United States Patent [19]
Cooper

[11] 3,911,020
[45] Oct. 7, 1975

[54] PROCESS FOR THE PREPARATION OF DIALKYLBENZENE DIHYDROPEROXIDE

[75] Inventor: William D. Cooper, Houston, Tex.

[73] Assignee: The Goodyear Tire & Rubber Company, Akron, Ohio

[22] Filed: Mar. 27, 1973

[21] Appl. No.: 345,340

Related U.S. Application Data

[63] Continuation of Ser. No. 844,956, July 25, 1969, abandoned, which is a continuation-in-part of Ser. No. 655,229, July 21, 1967, abandoned.

[52] U.S. Cl. .......................... 260/610 B; 260/610 A
[51] Int. Cl.² ..................................... C07C 179/02
[58] Field of Search..... 260/610 A, 610 B; 844/956; 855/229

[56] References Cited
UNITED STATES PATENTS
2,915,557  12/1959  Kreps et al...................... 260/610 A
3,190,924  6/1965  Sodomann et al. ............. 260/610 B FOREIGN PATENTS OR APPLICATIONS
641,250  8/1950  United Kingdom............. 260/610 B Primary Examiner—Bernard Helfin
Assistant Examiner—W. B. Lone
Attorney, Agent, or Firm—Browning & Bushman

[57] ABSTRACT

Para-dialkylbenzene dihydroperoxide is prepared in a continuous process by oxidizing para-dialkylbenzene with molecular oxygen in the presence of an alkaline material in an oxidation reactor, continuously removing the effluent from the oxidation reactor and cooling it to precipitate the dihydroperoxide, filtering the precipitated dihydroperoxide and thereafter displacement washing the filtered material with the amount of para-dialkylbenzene equal to the amount that was oxidized plus the amount of liquid remaining on the filtered material. The wash liquid is added to the filtrate liquid and this mixture is recycled to the oxidation reactor as feed.

4 Claims, 1 Drawing Figure

U.S. Patent   Oct. 7, 1975   3,911,020
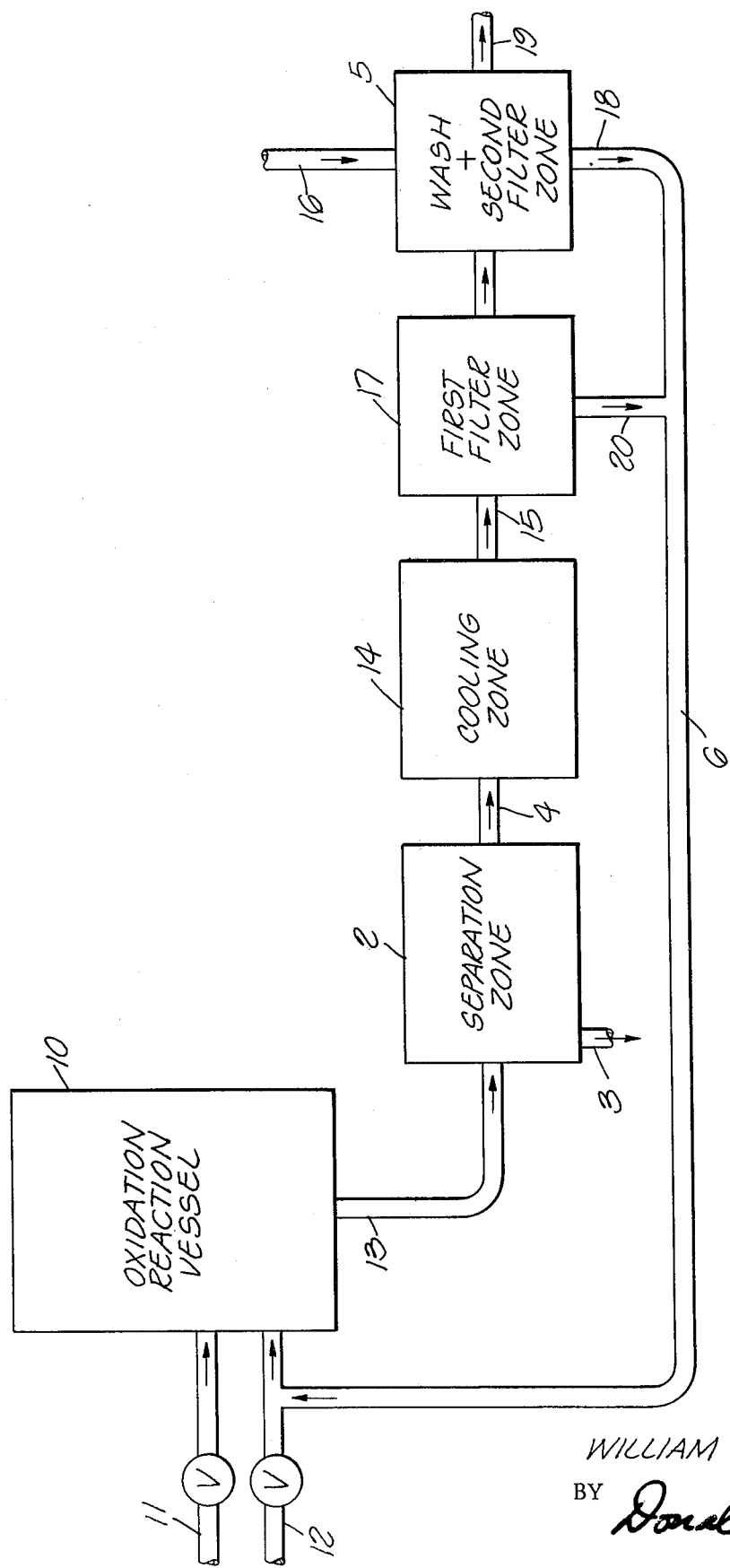
INVENTOR
WILLIAM D. COOPER
BY Donald W Cawby
ATTORNEY

PROCESS FOR THE PREPARATION OF DIALKYLBENZENE DIHYDROPEROXIDE

RELATED APPLICATION

This application is a continuation of application Ser. No. 844,956, filed July 25, 1969 now abaondoned, which application is a continuation-in-part application of my application Ser. No. 655,299 filed July 21, 1967 now abandoned.

BACKGROUND OF THE INVENTION

The para-dialkylbenzene dihydroperoxides which are the desired products of this process are valuable in that they may be subjected to an acid catalyzed reaction and thereby converted into hydroquinone. They are also useful as polymerization initiators in the production of polyolefinic materials.

Para-dialkylbenzene dihydroperoxide may be prepared by oxidizing para-dialkylbenzene with molecular oxygen under controlled oxidation conditions. Many examples of such oxidation reaction are available in the prior art. Such oxidation reactions are generally carried out in the liquid phase at temperatures between 90° and about 130° C. and at superatmospheric pressures up to about 250 psia. Such oxidation reactions are generally carried out in the presence of alkaline materials which are added to the oxidation reactor either in anhydrous form or in aqueous solution. Alkaline materials are added to the reaction to form a salt with the small amounts of organic acid which are produced in this oxidation reaction. These organic acids, if left unconverted, have a deleterious effect upon the oxidation reaction.

Oxidation reactions performed to produce dihydroperoxide are continued until only about 30 to 50% of the dialkylbenzene present is converted to oxidation products. Experience has shown that at conversion levels higher than these, the yield of dihydroperoxide based upon dialkylbenzene consumed, decrease. Such decrease in dihydroperoxide yield is due to the increased yield of oxidation side reaction products which occur at higher dialkylbenzene conversion.

The major oxidation reaction side product is a peroxy carbinol, that is a compound formed from the dialkylbenzene which has one hydroperoxide function and one alcohol function ($\alpha$hydroxy-$\alpha$hydroperoxy-para-dialkylbenzene). This peroxy carbinol may exist in the reaction effluent mixture in an amount equal to about 20% of the dihydroperoxide present in such mixture.

In addition to the dihydroperoxide and the undesirable side reaction products formed in the oxidation reaction, large amounts of dialkylbenzene mono-hydroperoxide are also formed. The mono-hydroperoxide, although it is not the desired product, is valuable as it can be recycled to undergo further oxidation and converted to the desired dihydroperoxide.

The oxidation reaction mixture thus consists of dihydroperoxide, mono-hydroperoxide, salts of organic acids and other reaction side products, including the peroxy carbinol, as well as some unreacted dialkylbenzene. The dihydroperoxide which is the desired product comprises only a minor amount of this oxidation reaction effluent. In order that this oxidation process may be economical, the unreacted dialkylbenzene and the mono-hydroperoxide must be separated from this oxidation reaction effluent and subjected to further oxidation to produce dihydroperoxide. It is preferable that the unreacted dialkylbenzene and the mono-hydroperoxide be returned to the original oxidation reactor along with fresh dialkylbenzene so that the oxidation may be operated continuously to produce dihydroperoxide in good yield.

It is known that in such oxidation reactions paradialkylbenzene dihydroperoxide will crystalize from the oxidation reaction effluent when it is cooled to about 25° C. The solid dihydroperoxide may then be recovered by separation from the liquid oxidation reaction effluent. The solid dihydroperoxide when separated from the oxidation reaction effluent by conventional means such as vacuum filtration or centrifugal filtration, contains substantial amounts of mono-hydroperoxide as well as unreacted dialkylbenzene and oxidation side reaction products as discussed above. It is desirable to recover the mono-hydroperoxide which is entrained in the solid dihydroperoxide so that it may be returned to the oxidation reaction for further oxidation to dihydroperoxide. It must be kept in mind, where a continuous oxidation reaction is envisioned employing a recycle of unreacted dialkylbenzene and mono-hydroperoxide, that oxidation side reaction products must not be allowed to build up uncontrollably in the recycle stream. Should such side reaction products be allowed to build up they would soon become the dominant material in the oxidation reactor and further production of dihydroperoxide would be severely limited. Should the prior art separation be employed, which involves dissolving the oxidation reaction effluent in dilute alkaline solution and subsequently extracting the mono-hydroperoxide from the alkaline solution with an organic solvent, then the oxidation side reaction products will be extracted along with the mono-hydroperoxide in the organic solvent. These oxidation reaction side products would then be recycled along with the mono-hydroperoxide to the oxidation reactor. Thus over a period of time they would build up to the point where the oxidation reaction will be seriously inhibited. It is possible to treat the recycle stream to remove or convert these side reaction products. Hydrogenating this stream converts these reaction side products back to the dialkylbenzene. However this hydrogenation process involves additional cost and the monohydroperoxide is converted back to diisopropylbenzene.

Another method to separate these side products from the recycle stream is by a distillation process. However, distillation requires heating the materials to be separated, and the mono-hydroperoxide is subject to decomposition when heated. Vacuum distillation, on the other hand, which does not involve heating, is an expensive and difficult to control separation process.

SUMMARY OF THE INVENTION

In the continuous process of producing para-dialkylbenzene dihydroperoxide from para-dialkylbenzene by oxidation with molecular oxygen and employing a continuous recycle of unreacted dialkylbenzene and mono-hydroperoxide, a direct method of recovering mono-hydroperoxide from the solid dihydroperoxide for recycle to the oxidation reactor has been discovered. After the oxidation reaction effluent is removed from the reactor and cooled to allow the dihydroperoxide to precipitate and the dihydroperoxide is separated from the liquid effluent material, the solid dihydroperoxide cake is subjected to a wash treatment with fresh dialkylbenzene material. Dialkylbenzene wash is then separated from the solid dihydroperoxide by filtration, and combined with the mono-hydroperoxide and unreacted dialkylbenzene to form the feed to the oxidation reaction. The amount of dialkylbenzene added is sufficient to replace the mono-hydroperoxide present in the original dihydroperoxide cake plus the amount of dialkylbenzene consumed in the oxidation reaction. In this way fresh dialkylbenzene is supplied to the oxidation reaction continuously to make up that which is removed with the oxidation products, thus the oxidation reaction may be continued indefinitely as a continuous reaction process. The method of this process results in the mono-hydroperoxide being returned to the oxidation reactor for further oxidation and at the same time results in the reaction side products remaining with the solid dihydroperoxide cake. Therefore the mono-hydroperoxide is recovered for recycle to the oxidation reactor and the side products are effectively removed and thus are not allowed to build up within the oxidation reaction cycle. By following the steps of this process most of the reaction side products are left with the dihydroperoxide and are thus effectively removed from the oxidation reactor thus preventing undesirable buildup. Dihydroperoxide recovered in this manner may be subjected directly to acid catalyzed reaction to form hydroquinone or it may be subjected to additional purification steps to remove the reaction side products therefrom.

BRIEF DESCRIPTION OF THE DRAWING

The drawing shows, in schematic form, the continuous oxidation reaction process of my present invention, involving a continuous recycle wherein para-dialkylbenzenes are converted to para-dialkylbenzene dihydroperoxides, which are precipitated and then treated with fresh dialkylbenzene which is then recycled to the oxidation reactor.

DETAILED DESCRIPTION

According to the process of the present invention, a p-diisopropylbenzene is caused to react with molecular oxygen in the presence of a small amount of alkaline material. Although my invention is described specifically and claimed with respect to p-diisopropylbenzene dihydroperoxide, my process may also be applied to other dialkylbenzene dihydroperoxides, produced by the oxidation of p-dialkylbenzenes which will oxidize to form hydroperoxides, such as those having the general formula

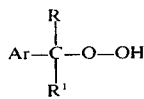

where R and R$^1$ may be alkyl, cycloalkyl or hydrogen, for example xylene, p-diethylbenzene, p-diisopropylbenzene, and p-disecbutylbenzene.

The molecular oxygen used in the reaction may be added as pure oxygen or in admixture with other non reactive gases, such as nitrogen. The oxygen may be provided as air, however, higher oxygen concentration in the gas is usually preferred to increase the oxidation rate. The oxidation reaction may be performed at a variety of pressures. Such reaction pressures may vary from about atmospheric to about 250 psia. The higher range of pressures, i.e., 100 to 250 psia, are preferred to take advantage of the increased reaction rates and to minimize losses of dialkylbenzene vapors which leave the reaction zone with the unreacted gases through the pressure control means. The oxygen is normally added to the reaction mixture near the bottom of the reaction vessel through a sparger or other type of distributor. Such addition of oxygen improves the contact between the oxygen and the liquid reactants and thereby increases the oxidation reaction rate.

The alkaline material present during the oxidation reaction may be any suitable basic material which will neutralize the acid by-products of the oxidation reaction. Such acids inhibit the oxidation reaction. Dilute aqueous solutions of materials such as alkali and alkaline earth metal oxides, hydroxides, carbonates and bicarbonates may be utilized. Aqueous solutions containing from about 0.1 to about 10 wt. % alkali or a solid anhydrous alkaline material are useful. Suitable amounts of these basic materials are between about 0.001% to about 5.0% by weight of the total reaction mixture.

Optimum reaction rates are maintained utilizing temperatures between about 100° and 140° C. Higher temperatures tend to produce excessive by-products, whereas at the lower temperatures reaction rates are too slow.

Residence time of a given amount of reactants within the oxidation reactor under oxidizing conditions may be varied to produce the desired level of oxidation. The residence time is dependent upon the rate of the oxidation and the desired conversion level of oxidation. Oxidation levels where between about 25% and 55% of the dialkylbenzene is oxidized are preferred. At these conversion levels the oxidation reaction effluent is still fluid and is easily processed to recover the desired dihydroperoxide. The dihydroperoxide constitutes about 20% or more of the oxidation products. Thus if the extent of oxidation is above about 55% conversion, the solid dihydroperoxide concentration becomes excessive and the reaction mixture becomes very viscous or even solid at room temperature. Where the dihydroperoxide concentration is too low, it will not precipitate from the cooled effluent. In either case, product recovery is difficult.

Any suitable oxidation reactor may be utilized, such as an autoclave or the like, which is capable of maintaining oxygen pressure at the desired level. The reaction vessel should have appropriate heat exchange means for maintaining the desired reaction temperature, and a means for controlling the pressure within the reaction zone. The reaction vessel must be fitted with means for introducing liquid reactants and means for introducing the oxygen containing gas. Adequate means of mixing the reactants should be provided to increase the reaction rate. The reaction vessel must also be equipped with a means for withdrawing the liquid reaction effluent for further processing to recover the dihydroperoxide. The oxidation reaction zone may consist of more than one vessel, in which case each vessel must be equipped as described above.

As the effluent stream leaves the reaction vessel it will be at the temperature of the reaction, and will contain the excess alkaline material as well as the salts of any organic acids which formed in the oxidation reaction. These alkaline materials and organic acid salts should be removed before further processing. Where the alkaline material is added to the reactor as a water solution this aqueous phase, containing excess alkali and the organic acid salts, may be conveniently separated from the organic phase of the reaction effluent by a decantation step. Where the alkaline material is added to the reactor in an anhydrous form, the excess alkali and the organic acid salts may be removed from the reaction effluent by mixing water with the reaction effluent and then separating this aqueous phase containing the excess alkali and the organic acid salts from the organic phase of the reaction effluent. Such separation of alkaline materials and organic acid salts may be conveniently carried out either before or after the oxidation reaction effluent has been cooled. If the oxidation reaction effluent is washed while hot, sufficient pressure must be employed to prevent the vaporization of the wash water.

The effluent stream, after removal of the excess alkali and organic acid salts if still hot must be cooled to between about 15° and about 45° C. to precipitate the dihydroperoxide from the reaction mixture. In cooling the effluent to recover the dihydroperoxide, temperature control is important to the optiumum dihydroperoxide recovery. Where temperature of the product mixture becomes too low, the mixture becomes viscous and solid separation is difficult. If temperatures are too high, an excessive amount of dihydroperoxide remains in solution and is not recovered. Cooling may be accomplished by any convenient means such as passing the effluent through a heat exchanger or the like. The dihydroperoxide may then be collected by any suitable means of separating a liquid and a solid such as filtration, decantation, straining, centrifugation, syphoning and the like. The separated solid material, which may be in the form of a filter cake or other solid form, contains the solid dihydroperoxide and a major amount of the oxidation reaction side products. It is wet with the liquid phase of the reaction mixture which also contains para-diisopropylbenzene, para-diisopropylbenzene mono-hydroperoxide, small amounts of reaction side products and alkaline materials as well as some dissolved dihydroperoxide. The liquid filtrate is recycled to the oxidation reaction zone along with the product wash liquid described below.

The wash liquid, according to the invention, is the same as that material oxidized. Where, in the oxidation reaction, a p-diisopropylbenzene is oxidized to prepare p-diisopropylbenzene dihydroperoxide, the wash liquid is diisopropylbenzene. The wash liquid will displace substantially all of the mono-hydroperoxide from the solid oxidation products, leaving behind the major amount of the dihydroperoxide and reaction side products, notably the peroxy carbinol. By this method the oxidation reaction may be carried out continuously with the major portion of the unreacted diisopropylbenzene and the mono-hydroperoxide along with fresh diisopropylbenzene being returned to the oxidation reaction. The major portion of the side reaction products, particularly the peroxy carbinol, are removed from the system as solids, along with the dihydroperoxide. The side products do not build up in the system to a level where they will interfere with the oxidation reaction. In addition, no further treatment is required for the material which is recycled to the oxidation reaction. For this process to achieve and maintain steady state conditions, the amount of wash liquid used must be carefully controlled. In such a manner, the amount of wash liquid is an amount of diisopropylbenzene sufficient to make up for the amount of diisopropylbenzene removed from the system as oxidation products and as entrainment within the solid products. Since monohydroperoxide containing displacement wash liquid is returned to the oxidation zone, if the amount of wash liquid is too great it will cause dilution of the reaction mixture thereby upsetting the steady state conditions. On the other hand, if the amount of wash liquid is too small, not only will the steady state conditions be upset but insufficient displacement of the monohydroperoxide may result. Thus, the amount of wash liquid employed is significant and critical in this sense. Use of the aforementioned amount of p-isopropylbenzene wash liquid will insure a complete and effective washing of the solid product. In washing the filtered dihydroperoxide it may be convenient to break up the filter cake somewhat or otherwise pulverize the product, slurry it in the wash liquor and filter the solids. Temperatures used in the washing step are not critical but are preferably below about 50° C. Ambient temperatures are quite satisfactory. The dihydroperoxide may be separated from the wash liquid by any suitable means.

The dihydroperoxide wet with diisopropylbenzene and contain the major amount of side products formed in the oxidation reaction may be used as is or it may be subjected to further treatment to purify the dihydroperoxide. One of the preferred uses of this dihydroperoxide is in the preparation of hydroquinone. For this use, the dihydroperoxide may be used as is, without further purification. In such a method the dihydroperoxide is treated with a suitable acid acting catalyst whereby it is rearranged to hydroquinone and the coproduct carbonyl compound. In the subsequent processing steps required to recover high purity hydroquinone, it is convenient to remove both the oxidation reaction side products as well as the rearrangement reaction side products.

The description of the process of the invention may be further described by reference to the accompanying schematic representation of the apparatus used in a continuous type operation. The oxidation reaction takes place in vessel 10 into which is introduced gas containing free oxygen via line 11. The alkylated aromatic compound to be oxidized and the alkaline material enter the vessel via line 12. Once the desired extent of oxidation of the alkylated aromatic has been achieved, e.g., about 25 to 55% the effluent, which will contain dihydroperoxide along with monohydroperoxide, oxidation reaction side products and unreacted dialkyl aromatic, is drawn off via line 13 into separation zone 2, wherein the aqueous alkaline phase is separated from the organic phase. The aqueous alkaline phase is withdrawn from the process via line 3. The organic phase is removed from the separation zone 2 to cooling zone 14 via line 4. Within the cooling zone 14 the temperature of the dihydroperoxide solution is decreased until the desired extent of crystallization of dihydroperoxide and the oxidation side reaction products, is obtained. The mixture is then passed into a first filtration zone 17 via line 15. The separated mother liquor which contains mono-hydroperoxide and unreacted diisopropylbenzene is returned to the oxidation zone via line 20. The solid dihydroperoxide material from the first filtration zone 17 is then treated with the appropriate amount of diisopropylbenzene aromatic wash liquid which is introduced via line 16 in wash zone 5 and subjected to a second filtration in wash zone 5. The wash liquid is withdrawn via line 18 and recycled to the oxidation vessel 10 via line 6 with the filtrate from the first filtration zone. The solid dihydroperoxide product is recovered via line 19. While two filter or solids separation operations are described, one before and one after the DIPB wash, it can be appreciated that both filter operations can be accomplished on a single filter drum in accordance with solids separation practices well known to those skilled in the art.

The dihydroperoxide obtained from the processes of the present invention may be used directly in preparing hydroquinone or the like without the necessity of treating the reaction mixture by expensive and time consuming methods used heretofore as set forth above. In addition, the present process is ideal for a large scale continuous commercial type operation.

In order to better illustrate the manner in which the invention is carried out, the following example is provided. It is to be understood that the example is for the purpose of illustration only and is not to be regarded as limiting the broader process as described herein in any way.

EXAMPLE

Into a 5 gallon autoclave was placed about 13 liters of para-diisopropylbenzene. The autoclave contained a hollow-shaft turbine-type agitator as well as an inlet for the introduction of oxygen under pressure and liquid reactant. The reactor was surrounded by a heating jacket, as well as internal cooling coils. About 2 liters of 10 wt. % aqueous sodium carbonate solution was added to the reactor with the para-diisopropylbenzene to be oxidized. The reactor was purged with oxygen and then brought to a pressure of between 100 and 150 psig with oxygen. The reaction temperature was maintained at between 110° and 125° C. When the conversion to hydroperoxide was approximately 40%, continuous operation was begun. The effluent which was withdrawn from the reactor was cooled to about 20° C. whereupon the dihydroperoxide precipitated from the reaction mixture and a large portion of the aqueous alkaline phase which separated as a lower layer was removed. The hydroperoxide concentration of the reactor effluent was found to be about 75% mono-hydroperoxide and about 25% dihydroperoxide. Thus, the amount of starting material oxidized to dihydroperoxide was approximately 10%. The dihydroperoxide was separated from the reaction mixture by a centrifugal filter using batches of about 13 liters of effluent each, and the filtrate was recycled to the reaction vessel. The dihydroperoxide cake which retained about 400 ml. of para-diisopropylbenzene, was washed in the centrifuge with about 1700 ml. of para-diisopropylbenzene at room temperature, and this filtrate added to the recycle to the reaction vessel. The amount of para-diisopropylbenzene wash (1700 ml.) used accounted for the 1300 ml. of para-diisopropylbenzene which had been oxidized to dihydroperoxide product and removed from the reaction mixture i.e., one-fourth of the 40% of para-diisopropylbenzene oxidized to hydroperoxide, plus the amount of reactant retained by the dihydroperoxide cake (approximately 400 ml.). The para-diisopropylbenzene dihydroperoxide was then washed with about 1700 ml. of water in order to remove any remaining traces of sodium carbonate present. The amount of para-diisopropylbenzene dihydroperoxide obtained was about 100 grams. By this process steady state reaction conditions were maintained while producing a good yield of dihydroperoxide product.

Various changes, alterations, additions and modifications can be made in the present process, and its steps and conditions, and all such changes, alterations and modifications which are within the scope of and form a part of my present invention.

What is claimed is:

1. A method for preparing para-dialkylbenzene dihydroperoxide, comprising the steps:
   a. oxidizing a dialkylbenzene selected from the group consisting of p-xylene, p-diethylbenzene, p-diisopropylbenzene and p-disecbutylbenzene in the presence of molecular oxygen and a small amount of an aqueous solution of an alkaline material selected from the group consisting of alkali and alkaline earth metal oxides, hydroxides, carbonates, and bicarbonates at a temperature between about 100° and 140°C to effect between about 25% and 55% conversion,
   b. separating the effluent obtained from the reaction of step (a) into an aqueous phase and a non-aqueous phase,
   c. cooling the non-aqueous phase to between about 15° and 45° to effect crystallization of a dihydroperoxide material including p-dialkylbenzene dihydroperoxide,
   d. physically separating said cooled non-aqueous phase into solid dihydroperoxide material from the liquid non-aqueous fraction containing p-dialkylbenzene mono-hydroperoxide and unreacted p-dialkylbenzene,
   e. displacement washing said solid dihydroperoxide material with an amount of p-dialkylbenzene approximately equal to the amount of the p-dialkylbenzene which was oxidized in step (a) plus the amount remaining with said solid dihydroperoxide,
   f. separating said solid dihydroperoxide material from said wash liquid, and
   g. recycling the recovered wash liquid of step (e) and the non-aqueous fraction from step (d) to the oxidation reaction of step (a).

2. The method of claim 1 wherein the alkaline material is an alkali metal carbonate.

3. The method of claim 1 wherein the alkaline material is present in an amount of from about 0.001 to 5.0% by weight of the total reaction mixture.

4. The method of claim 1 wherein said oxidation side reaction products are separating and included with said solid dihydroperoxide material in step (e).

* * * * *